UNITED STATES PATENT OFFICE.

KARL THIESS, OF SINDLINGEN, NEAR HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

VAT DYESTUFFS AND PROCESS OF MAKING SAME.

1,151,628.     Specification of Letters Patent.     Patented Aug. 31, 1915.

No Drawing.     Application filed February 12, 1914. Serial No. 818,221.

*To all whom it may concern:*

Be it known that I, KARL THIESS, Ph. D., chemist, a citizen of the Empire of Germany, residing at Sindlingen, near Höchst-on-the-Main, Germany, have invented certain new and useful Improvements in Vat Dyestuffs and Processes of Making Same, of which the following is a specification.

In U. S. Patent application Serial No. 754,141, filed March 13, 1913, are described sulfurized vat dyestuffs which are produced by the introduction of sulfur into the molecule of the condensation product from halogenoquinones and arylamines, the halogen contained in the quinone nucleus being partly or completely eliminated. These sulfurized dyestuffs are obtainable by treating said condensation products with metallic sulfids, metallic sulfhydrates, salts of the thiocarbonic acid, hydrogen sulfid or with substances of similar action and capable of splitting off hydrogen sulfid. They dye animal fibers in the vat tints varying from yellowish-brown to brown, reddish-brown and reddish of great fastness and intensity.

Now I have made the observation that sulfur itself in presence of a body capable of binding halogen can be used as a means for introducing sulfur into the molecule of the aryl-amino-halogeno-quinones. The products of the reaction constitute all, like those referred to in U. S. Patent Application Serial No. 754,141, sulfurized vat dyestuffs containing the quinone residue, but the dyestuffs obtained according to my present invention dye wool gray to black, particularly olive-gray, grayish-blue to black tints. These new dyestuffs show a characteristic coloration with concentrated sulfuric acid; they are insoluble in most of the organic solvents and contain more organically-bound sulfur than the dyestuffs described in said U. S. Patent Application Serial No. 754,141.

Instead of the sulfur with a halogen-binding body, there may be used in the present new process sulfur in the form of thiosulfate as an equivalent, having the same action.

The following examples illustrate my invention:—

Example I: 35 parts of 2.5-dichloro-3.6-dianilino-quinone of the formula:—

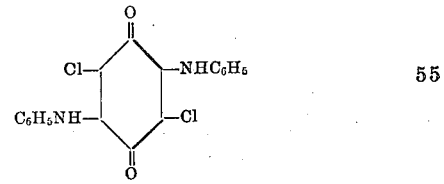

250 parts of alcohol of 95% strength, 30 parts of anhydrous sodium acetate and 10 parts of flowers of sulfur are heated in an autoclave for 10 hours to 150–155° C. The further operations consist in filtering and extracting the residue with sodium sulfite solution and water. The dyestuff thus obtained dyes wool fast, intense brownish black tints and is soluble in concentrated sulfuric acid with a dark blue-violet color; it is insoluble in almost all of the organic solvents.

Example II: 75 parts of the condensation product from chloranil and anilin (2.5-dichloro-3.6-dianilino-quinone) are heated in an autoclave for 12 hours to 150–155° C. with 600 parts of alcohol of 95% strength and 120 parts of crystallized sodium thiosulfate. The contents of the autoclave are then filtered and the blackish residue is extracted with boiling water and a soda solution of 2 per cent. strength and dried. The dyestuff thus obtained dyes wool fast, intense brownish black tints and is soluble in concentrated sulfuric acid with a dark blue-violet color; it is insoluble in almost all of the organic solvents.

Example III: 100 parts of 2.5-dichloro-3.6-dianilino-quinone, 1200 parts of water and 200 parts of crystalline sodium thiosulfate are heated in an autoclave for 10 hours to 150–155° C. The product of the reaction is then treated as indicated in Example II. The dyestuff thus obtained dyes wool deep olive-gray tints, it is soluble in concentrated sulfuric acid with a grayish-blue color and insoluble in most of the organic solvents.

Example IV: 40 parts of 2.5-dichloro-3.6-dianilino-quinone, 300 parts of pyridin and 35 parts of anhydrous sodium thiosulfate are heated to boiling for 9 hours. After cooling, the mass is filtered and the residue extracted with boiling alcohol. The dyestuff thus separated forms a blackish crystalline powder and dyes wool intense brownish-black tints of great fastness.

Example V: 45 parts of 2.5-dichloro-3.6-dianilino-quinone, 300 parts of pyridin, 15 parts of anhydrous sodium acetate and 18 parts of flowers of sulfur are heated to boiling for 6 hours. After cooling, the mass is filtered and extracted with alcohol, sodium sulfite solution and water. The dyestuff thus obtained dyes wool dark-brown to dark-blackish tints.

If in the foregoing example the condensation product from chloranil and p-toluidin is used, the resulting dyestuffs dye considerably redder tints. Instead of alcohol and pyridin there may be employed any other diluent.

Having now described my invention, what I claim is:—

1. As a new process, the manufacture of olive-gray to black vat dyestuffs containing sulfur and the quinone residue, by treating an arylaminohalogenoquinone with sulfur in presence of a body capable of binding halogen.

2. As a new process, the manufacture of olive-gray to black vat dyestuffs containing sulfur and the quinone residue, by treating an arylaminohalogenoquinone with sulfur in presence of a body capable of binding halogen and of a diluent.

3. As new products, the vat dyestuffs containing sulfur and a quinone residue, obtainable by treating an arylaminohalogenoquinone with sulfur in presence of a body capable of binding halogen, being olive-gray to black powders, almost insoluble in organic diluents, soluble in concentrated sulfuric acid with a characteristic coloration, dyeing wool from the vat olive-gray to blackish tints of great fastness.

4. As a new product, the vat dyestuff containing sulfur and a quinone residue, obtainable by treating 2.5-dianilino-3.6-dichloroquinone with sulfur in presence of a body capable of binding halogen, being a blackish powder, almost insoluble in organic diluents, soluble in concentrated sulfuric acid with a dark bluish-violet color, and dyeing wool from the vat blackish tints of excellent fastness.

In testimony whereof I affix my signature in presence of two witnesses.

KARL THIESS.

Witnesses:
  JEAN GRUND,
  CARL GRUND.